(12) United States Patent
Brunaux et al.

(10) Patent No.: US 9,643,724 B2
(45) Date of Patent: May 9, 2017

(54) AIRCRAFT GALLEY CONFIGURATION

(71) Applicant: Driessen Aerospace Group N.V., Alkmaar (NL)

(72) Inventors: Yannick Brunaux, Croix (FR); Britta Appolt, Kuerten (DE); Sebastien Sivignon, Brax (FR); Claude Martin, Lury sur Arnon (FR)

(73) Assignee: Driessen Aerospace Group N.V., Alkmaar (NL)

( * ) Notice: Subject to any disclaimer, the term of this patent is extended or adjusted under 35 U.S.C. 154(b) by 0 days.

(21) Appl. No.: 14/481,988

(22) Filed: Sep. 10, 2014

(65) Prior Publication Data

US 2015/0069180 A1    Mar. 12, 2015

Related U.S. Application Data

(60) Provisional application No. 61/876,369, filed on Sep. 11, 2013.

(51) Int. Cl.
*B64D 11/00* (2006.01)
*B64D 11/04* (2006.01)
*B64D 11/02* (2006.01)

(52) U.S. Cl.
CPC .............. *B64D 11/04* (2013.01); *B64D 11/02* (2013.01); *B64D 2011/0076* (2013.01)

(58) Field of Classification Search
CPC ............ B64D 11/00; B64D 2011/0046; B64D 2011/0069; B64D 11/04
USPC ...................................................... 244/118.5
See application file for complete search history.

(56) References Cited

U.S. PATENT DOCUMENTS

| 4,055,317 A | * | 10/1977 | Greiss | B64D 11/00 244/118.5 |
| 2004/0251384 A1 | * | 12/2004 | Sprenger | B64D 45/0015 244/118.5 |
| 2006/0113427 A1 | * | 6/2006 | Saint-Jalmes | B64D 11/0601 244/118.5 |

(Continued)

FOREIGN PATENT DOCUMENTS

| EP | 0901964 A2 | 3/1999 | |
| WO | 20120110643 A1 | 8/2012 | |
| WO | WO2012110643 | * 8/2012 | ............. B64D 11/02 |

OTHER PUBLICATIONS

Europe Patent Application No. 14184298.9, Extended Search Report mailed Feb. 5, 2015.

*Primary Examiner* — Brian M O'Hara
*Assistant Examiner* — Assres H Woldemaryam
(74) *Attorney, Agent, or Firm* — Kilpatrick Townsend & Stockton LLP; Dean W. Russell; Kristin M. Crall

(57) ABSTRACT

Embodiments of the present invention provide improved layouts that can increase space on-board aircraft and other passenger transport vehicles. The improved layouts may include two galley sections installed on an aircraft having a centerline and curved outer sidewalls. The first galley section can be positioned so that its longitudinal axis generally aligns with one of the outer sidewalls of the aircraft, and the second galley section can be positioned so that its longitudinal axis generally aligns with the longitudinal axis of the first galley. This can create a space along a rear side of the second galley section. The created space may be used for any number of options.

17 Claims, 3 Drawing Sheets

(56) References Cited

U.S. PATENT DOCUMENTS

| | | | |
|---|---|---|---|
| 2008/0011901 A1* | 1/2008 | Guering | B64D 11/00 244/118.5 |
| 2009/0261200 A1* | 10/2009 | Saint-Jalmes | B64D 11/04 244/118.5 |
| 2010/0219292 A1* | 9/2010 | Saint-Jalmes | B64D 11/0023 244/118.5 |
| 2012/0048998 A1* | 3/2012 | Schliwa | B64D 11/00 244/118.6 |
| 2012/0067230 A1 | 3/2012 | Fritz et al. | |
| 2013/0206904 A1* | 8/2013 | Gee | B64D 11/02 244/118.5 |
| 2014/0048650 A1* | 2/2014 | Schliwa | B64D 11/00 244/118.5 |
| 2014/0124622 A1* | 5/2014 | Boren | B64D 11/04 244/118.5 |

* cited by examiner

AIRCRAFT GALLEY CONFIGURATION

CROSS REFERENCE TO RELATED APPLICATIONS

This application claims the benefit of U.S. Provisional Application Ser. No. 61/876,369, filed Sep. 11, 2013, titled "Aircraft Aft Section Concept," the entire contents of which are hereby incorporated by reference.

FIELD OF THE DISCLOSURE

Embodiments of the present disclosure relate generally to improved layouts that provide increased space on-board aircraft and other passenger transport vehicles.

BACKGROUND

Passenger aircraft typically have a layout that includes galleys, lavatories, passenger seats, and crew seats. The aircraft must also have necessary safety equipment, cooling equipment, and electronics equipment on board. Aircraft also provide various types of storage space for passenger carry-on items, passenger comfort items, as well as for catering items and any other items that may need to be stored during flight. These components and storage spaces may be positioned at various locations in the aircraft, depending upon the size of the aircraft.

Aircraft designers consistently seek to develop improved ways to use space on-board passenger aircraft and other passenger transport vehicles. For example, they have experimented with various seat arrangements and various storage options.

DETAILED DESCRIPTION

Figure 1:
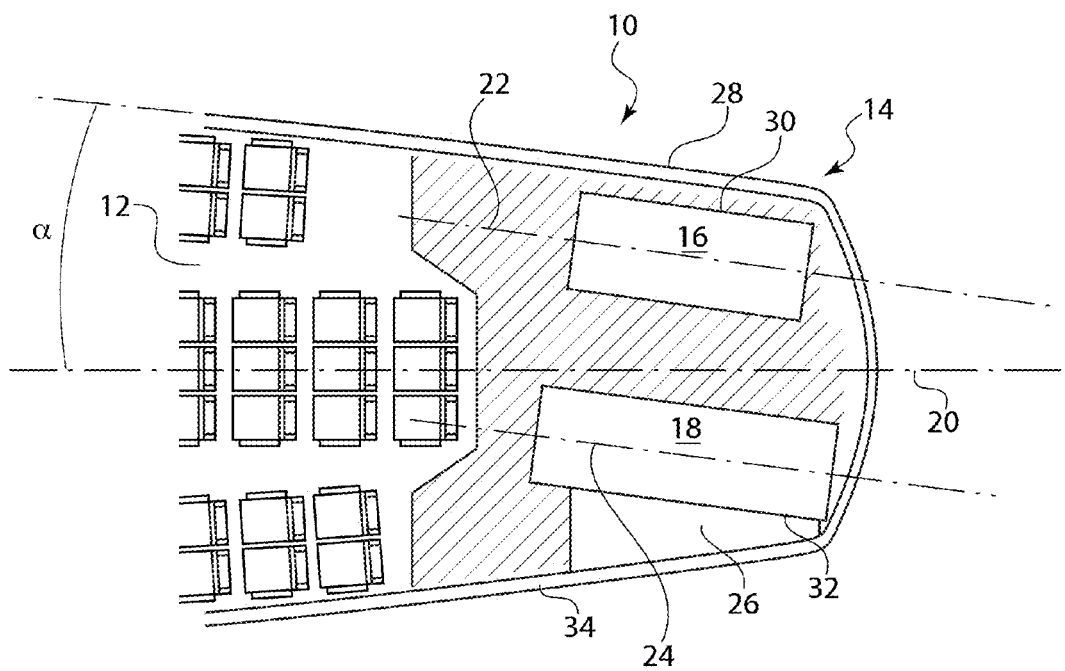
FIG. 1 shows a top plan view of a portion of an aircraft having two galley sections that are rotated off from the aircraft centerline.
Figure 3:
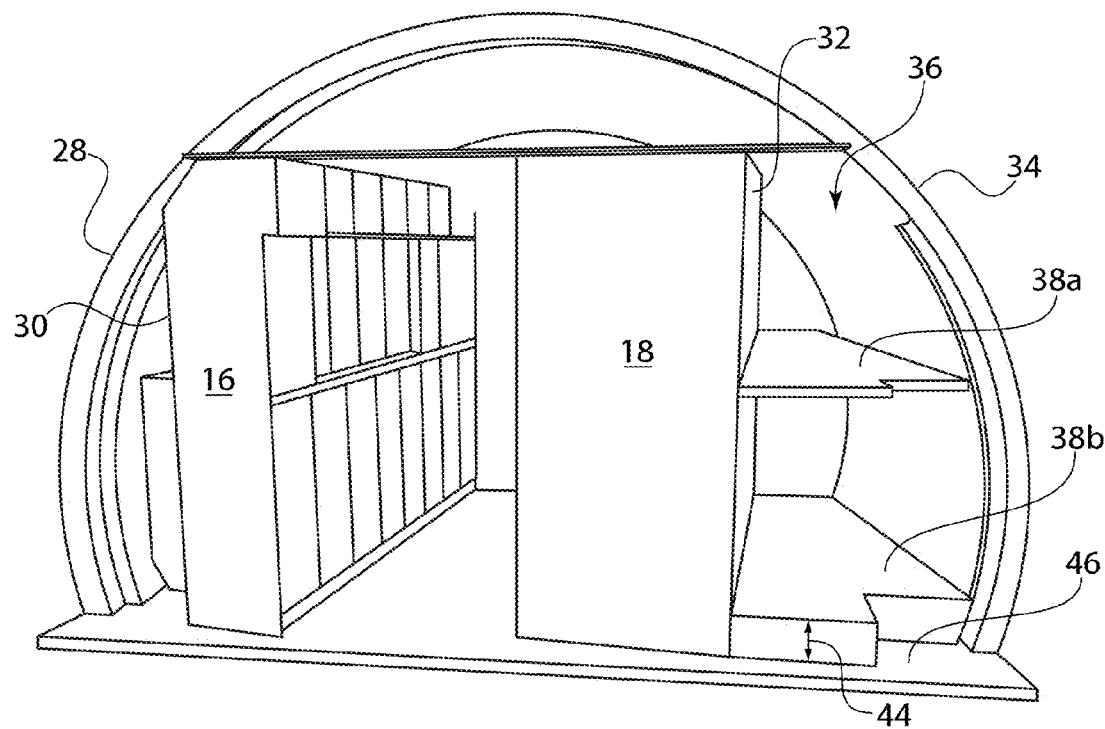
FIG. 3 shows a front perspective view of a space created along one side of a galley section configured for use as a crew member rest area.
Figure 6:
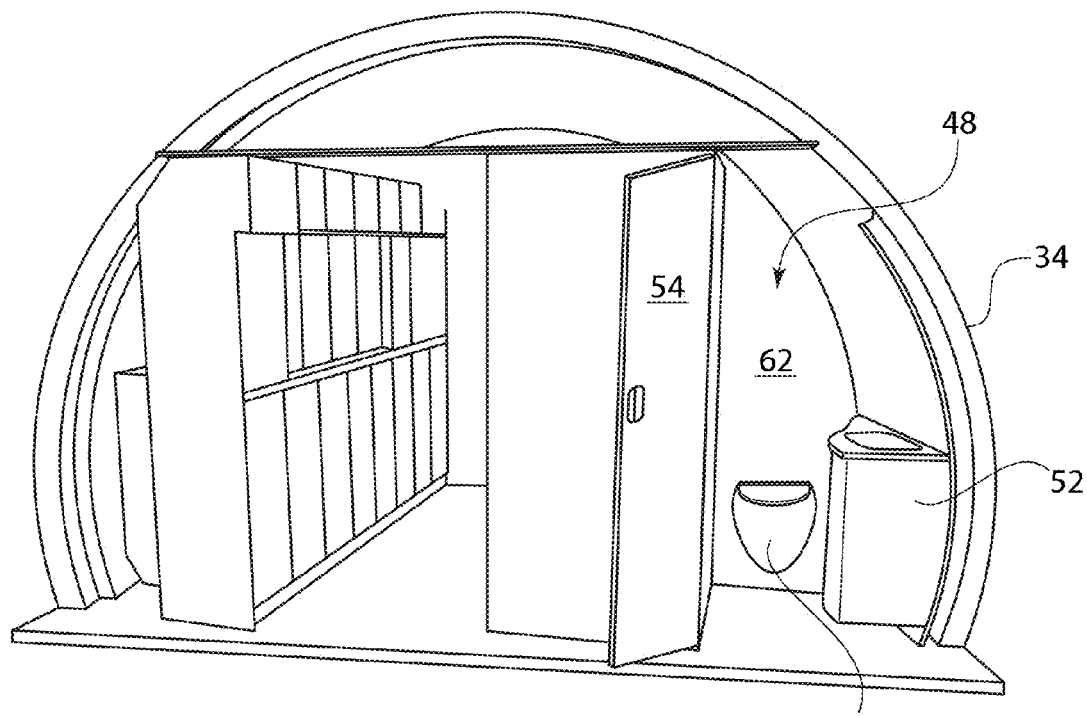
FIG. 6 shows a front perspective view of a space created along one side of a galley section configured for use as a lavatory.

Embodiments of the present disclosure provide improved layouts that provide increased and enhanced space usage on-board aircraft and other passenger transport vehicles. FIG. 1 illustrates an improved layout 10 for an aircraft 12. It has been found that this layout can be particularly beneficial when implemented at an aft 14 (or rear) section of the aircraft 12. It should be understood, however, that this layout may be implemented at any location on the aircraft or other passenger transport vehicle. In the embodiment shown, two galley sections 16, 18 are positioned on an aircraft 12. These galley sections 16, 18 may be traditional or modified aircraft galleys. For example, the galley sections may be of the type that have a lower space for trolleys and an upper space for miscellaneous stowage compartments, standard units, chillers, ovens, beverage makers, and other types of galley equipment, as shown in FIGS. 3 and 6.

The aircraft has a centerline 20 that divides the aircraft into left and right halves. The centerline may alternatively be considered as a dividing plane for the aircraft. Each galley section 16, 18 has a longitudinal axis 22, 24. As shown, the longitudinal axes 22, 24 of the galley sections 16, 18 are not parallel to the centerline 20 of the aircraft. This configuration may be referred to as the galley sections being rotated or positioned offset from the aircraft centerline 20 or center plane.

By contrast, traditional aircraft with galley sections generally provide the galley sections parallel to the centerline of the aircraft. The longitudinal axes of the galley sections are parallel to the centerline of the aircraft. The galley sections are symmetrical with respect to one another, such that the right side of the aircraft mirrors the left side of the aircraft. However, this configuration leaves an unused amount of space on each side of the galley section. In some aircraft, the Y/C economy seats immediately forward of the aft galley sections (or other sections on-board the vehicle) are sometimes used as crew rest seats or as a crew rest area. However, this may take up potential (revenue-generating) passenger seating space for (non revenue-generating) crew seating. By rotating the galley sections as shown in FIG. 1, additional space 26 may be created. In one example, this space may be used to provide crew member space. In one example, this space may be used to provide an additional lavatory. In one example, this space may be used for additional storage. Combinations thereof are also possible. The concepts described herein may be used on single aisle, twin aisle, or on larger aircraft.

Figure 2:
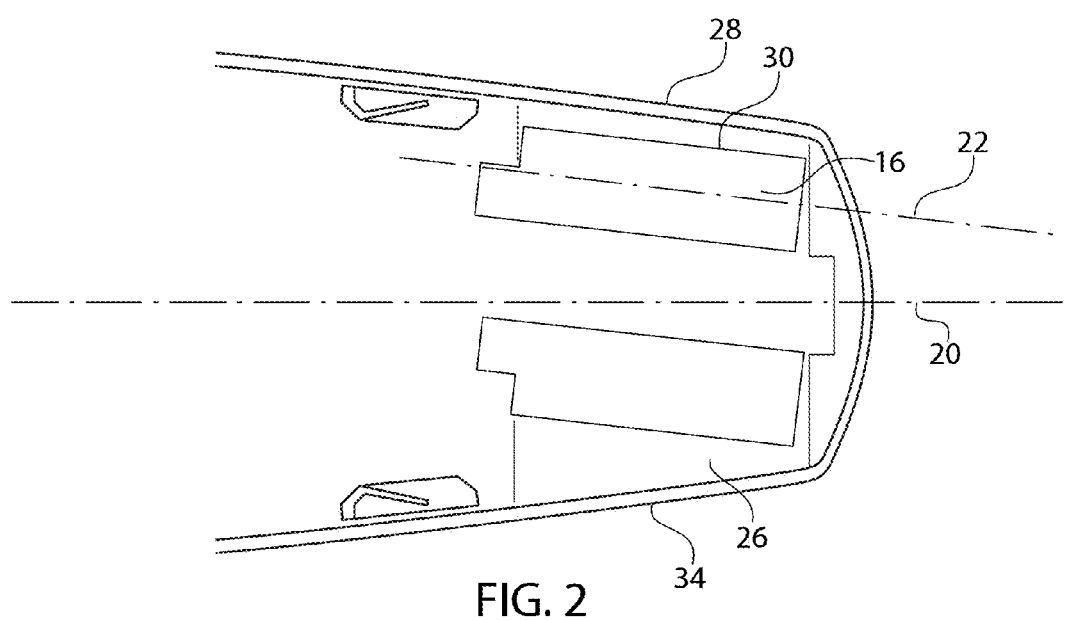
FIG. 2 shows a top plan view of rotated galley sections and one option of a space that may be created by the layout.

In one example, a first galley section 16 may be positioned so that its longitudinal axis 22 is generally aligned with a sidewall 28 of the aircraft 12. This means that the rear wall 30 of the galley section 16 can be positioned closer to the aircraft sidewall 28 than has traditionally been the case. As shown in FIG. 1, the aircraft sidewall 28 generally angles outwardly from the centerline as it moves from the aft to the middle/forward portion of the aircraft, as shown by the α. The sidewall 28 also has an outward curve. For example, as shown in FIG. 3, because the aircraft 12 is shaped as a tubular structure, the aircraft sidewall 28 is shown as having an outwardly curved shape. Thus, if the rear wall 30 of the galley section 16 is flat, it may not directly abut or touch the aircraft sidewall 28, but it may track along a similar plane as the sidewall 18. This is shown in the overhead view of FIG. 2. In a specific embodiment, the angle of the galley section 16 may range from about 7-12 degrees from the centerline 20. In another embodiment, the angle may range from about 9-10 degrees from the centerline 20. These details are provided as non-limiting examples only. It should be understood that the specific angle of the galley section 16 off of the aircraft centerline 20 depends upon the specific angle α of the aircraft sidewall off of the aircraft centerline 20.

The second galley section 18 may then be positioned so that its longitudinal axis 24 is generally aligned with the longitudinal axis 22 of the first galley section 16. In a specific embodiment, the second galley section 18 may be generally parallel to the first galley section 16. In a specific embodiment, the angle of the second galley section 18 may range from about 7-12 degrees from the centerline 20. In another embodiment, this angle may range from about 9-10 degrees from the centerline 20. These details are provided as non-limiting examples only. It should be understood that the specific angle of the second galley section 18 depends upon the specific angle α of the aircraft sidewall 28 along which the first galley section 16 tracks. This configuration allows the rear wall 32 of the galley section 18 to be positioned further away from the other aircraft sidewall 34 than has traditionally been the case. As shown, both galley sections 16, 18 may rotated or offset from the centerline of the aircraft or other vehicle, but positioned so that they remain generally symmetrical with respect to one another. This creates a uniformly-sized walkway in between the galley sections 16, 18 in which the attendants may work.

Figure 4:
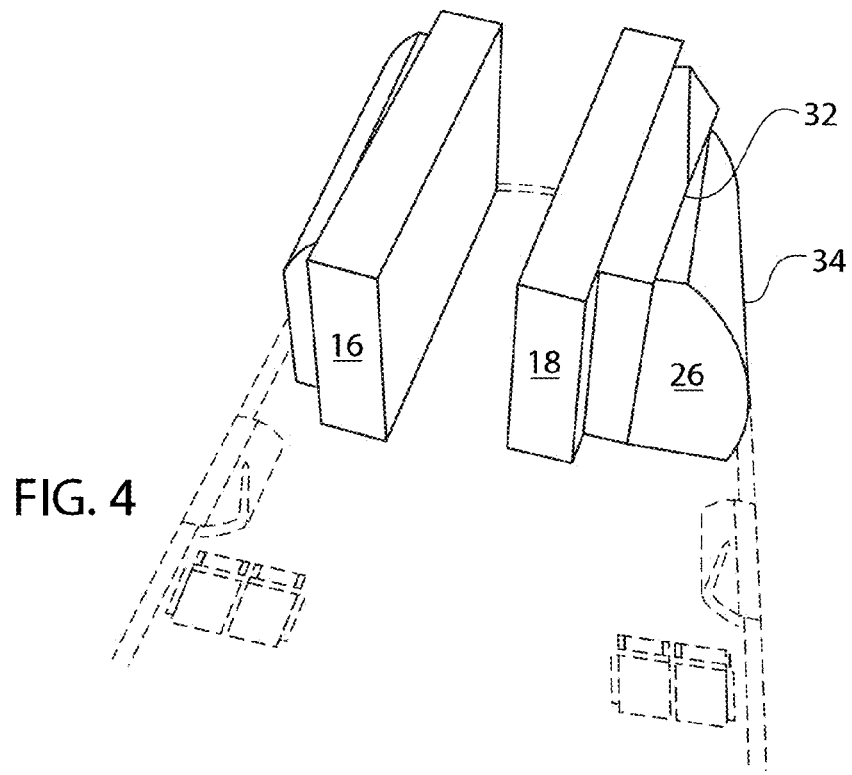
FIG. 4 shows a top perspective view of aircraft galley sections and the related space that may be created.

As shown in FIG. 4, because the aircraft 12 is shaped as a tubular structure, the aircraft sidewall 34 has an outward curve or an otherwise outwardly curved shape. There is thus a space 26 created between the rear wall 32 of the galley section 18 and the aircraft sidewall 34. This additional space 26 may be used in any number of ways. Although two specific options are shown, it should be understood that this additional space may be used in any number of ways. Non-limiting examples include use of the space a storage area, for housing a vending machine, a closet, for housing aircraft electronics or other equipment, for storing safety equipment, or any combination thereof.

In FIG. 3, this space 26 is shown as being used as to provide a compartment 36. In one example, the compartment 36 may be used as a crew rest compartment 36. In the example shown in FIG. 3, the compartment 36 may be divided into two crew rest levels 38a, 38b. For example, on international or other longer flights, the crew may need a place for resting. This use of space can provide a crew rest compartment 36 instead of using aircraft seats for this purpose. This enables the airline to potentially capture more revenue. In another example, the two levels 38 may be used for storage of pillows/blankets, catering items, emergency equipment, electronics, air conditioning equipment, additional trolleys, or any other use.

Storage of emergency equipment, safety equipment, or other items that may be necessary to have near the rear doors 42 of the aircraft may be stored at the rear of the compartment 36. Additionally or alternatively, it is possible to store such equipment or items beneath the lower level 38b of the compartment 36. For example, the lower level 38b is generally mounted about 20 cm above the aircraft floor. (This may be for routing of cooling ducts or other features.) This leaves an amount of space 44 below the compartment 38b that may be used for storage. In a specific embodiment, there may be provided a drawer or other pull out feature to easier access of items stored in space 44.

The figures also show a removed area 46 at an edge of the compartment 36. This removed area 46 may be provided for door clearance in order to allow a flight attendant to stand in the area 46 to direct passengers in the event of an emergency.

Although not shown, it is possible to provide a privacy curtain to close the compartment 36 if desired. It may also be possible to provide a closeable door for the compartment 36. The closeable door option is particularly feasible if a source of fresh air and a smoke detection feature is provided in the compartment 36 for its use as a rest area.

Figure 5:
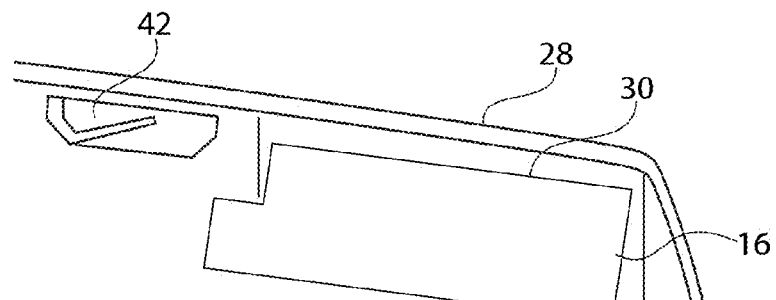
FIG. 5 shows a top plan view of rotated galley sections and an alternate option of a space that may be created by the layout.

In FIGS. 5-6, the space created due to rotation of the galley sections 16, 18 is shown as being used to provide a lavatory 48. As shown, the lavatory may have traditional lavatory components, such as a vacuum toilet 50, a sink/wash basin 52, and a door 54. One of the walls of the lavatory will simply be formed as a curved sidewall 34. As shown, this may be the sidewall 34 on which the sink 52 and its accompanying cabinet is positioned. The rear wall 62 may support the vacuum toilet 50. Although a specific layout is shown, it should be understood that the lavatory layout may be altered as desired. In the embodiment shown in FIG. 5, the space created by the rotation of offset of the galley sections 16, 18 may be used to provide additional galley space 58. This galley space 58 may be used to house an additional oven, chiller, beverage maker, emergency equipment, storage cubes, or for any other appropriate use. The offset of the galley sections 16, 18 may also create a further storage space 60 that may be positioned behind the lavatory 48. This space may be accessed through the back wall 62 of the lavatory or through the galley space 58.

It should be understood that there may be embodiments wherein only one galley section is rotated or angled, while the other galley section remains aligned with the centerline of the vehicle. It should also be understood that more than two galley sections may be positioned such that one or more of the galley sections is angled or rotated or otherwise not aligned with the vehicle centerline, while one or more other galley sections are not angled or rotated.

Further features may include a vehicle (12) comprising a galley, said galley comprising at least two galley sections (16, 18), each of the at least two galley sections (16,18) having a longitudinal axis (22, 24) and the vehicle (12) having a longitudinal centerline (20), characterized in that one of the at least two galley sections (16,18) being positioned so that its longitudinal axis is angled with respect to the longitudinal centerline (20) of the vehicle. The vehicle may have at least two galley sections (16,18) positioned so that their longitudinal axes are angled with respect to the longitudinal centerline (20) of the vehicle. The vehicle (12) may comprise a sidewall (28) and wherein an additional space (26) is created between a rear wall (32) of one (18) of the at least two galley sections (16, 18) and the vehicle sidewall (28). The additional space (26) may be configured to provide a crew rest space (36) or for use as a lavatory (48) or for use as a storage area, for housing a vending machine, a closet, for housing aircraft electronics or other equipment, for storing safety equipment, or any combination thereof. The additional space (26) may be divided into two or more compartments or levels. The levels/compartments may be a crew rest space. In another embodiment, the compartments (36) may be a space for use as a lavatory (48) or for use as a storage area, for housing a vending machine, a closet, for housing aircraft electronics or other equipment, for storing safety equipment, or any combination thereof. A lower area of one of the levels or compartments may comprise a drawer or a pull out feature. At least one of the levels (38a, 38b) may comprise a removed area (46) so as to provide a recess in order to allow a person to stand in the recess. One of the at least two galley sections (16, 18) may be positioned so that its longitudinal axis (22) is substantially parallel to the sidewall (28) of the vehicle (12). In another option, the longitudinal axes of each of the at least two galley sections (16,18) may be generally parallel to one another, but are not parallel to the vehicle longitudinal centerline (20). The vehicle galley may be positioned at a vehicle aft. In a specific option, the vehicle may be an aircraft.

Changes and modifications, additions and deletions may be made to the structures and methods recited above and shown in the drawings without departing from the scope or spirit of the invention and the following claims.

What is claimed is:

1. A galley layout for a vehicle, the vehicle having a centerline and vehicle sidewalls, the galley layout comprising:

at least two galley sections, each of the galley sections having a longitudinal axis, wherein the at least two galley sections are positioned so that longitudinal axes of the at least two galley sections are not aligned with the vehicle centerline, wherein a triangular compartment comprising upper and lower crew rest levels is created along a rear wall of one of the at least two galley sections, the triangular compartment defined at least in part by (a) the galley section rear wall that faces one of the vehicle sidewalls and (b) a sidewall of the vehicle.

2. The galley layout of claim 1, wherein the upper and lower crew rest levels are configured for use as a storage area, a closet, for housing aircraft electronics or other equipment, for storing safety equipment, or any combination thereof.

3. The galley layout of claim 1, wherein the at least two galley sections are both rotated or angled to one side of the centerline.

4. A galley layout for an aircraft, comprising:
 (a) first and second galley sections, each of the first and second galley sections having a longitudinal axis,
 (b) the aircraft having (i) a center plane that divides the aircraft into left and right hand sides and (ii) outer sidewalls defining planes that angle outwardly from the center plane,
 (c) the first and second galley sections each further comprising rear walls that face the outer sidewalls of the aircraft,
 wherein the first galley section is positioned so that the longitudinal axis of the first galley section is parallel with one of the outer sidewall planes and wherein the first and second galley sections are angled to one side of the center plane, wherein an enclosed triangular compartment is created along a side of the second galley section, the triangular compartment defined at least in part by the rear wall of the second galley section, the outer sidewall of the aircraft, and a privacy curtain or closeable door.

5. The galley layout of claim 4, wherein the second galley section is positioned so that the longitudinal axis of the second galley section is generally parallel with the longitudinal axis of the first galley section.

6. The galley layout of claim 4, wherein the longitudinal axes of the first and second galley sections are generally parallel to one another, but are not parallel to the aircraft center plane.

7. The galley layout of claim 6, wherein the enclosed triangular compartment is configured for use as a crew rest space.

8. The galley layout of claim 6, wherein the enclosed triangular compartment is configured for use as a lavatory.

9. The galley layout of claim 6, wherein the enclosed triangular compartment is configured for use as a storage area, for housing a vending machine, a closet, for housing aircraft electronics or other equipment, for storing safety equipment, or any combination thereof.

10. The galley layout of claim 4, wherein the first and second galley sections are both rotated to one side of the center plane.

11. A galley layout for an aircraft, the aircraft having a centerline and curved outer sidewalls, the galley layout comprising:
 first and second galley sections, each of the first and second galley sections having a longitudinal axis and rear walls, wherein the first galley section is positioned so that the longitudinal axis of the first galley section is parallel to one of the aircraft curved outer sidewalls, and wherein the second galley section is positioned so that the longitudinal axis of the second galley section is parallel to the longitudinal axis of the first galley section but not parallel to the outer sidewall such that the first and second galley sections are not aligned with the centerline of the aircraft, wherein a pie-shaped compartment is created along a rear side of the second galley section, the compartment defined at least in part by (a) the second galley section rear wall that faces the aircraft curved outer sidewall and (b) the curved outer sidewall of the aircraft.

12. The galley layout of claim 11, wherein the pie-shaped compartment is configured for use as a crew rest space.

13. The galley layout of claim 11, wherein the pie-shaped compartment is configured for use as a lavatory.

14. The galley layout of claim 11, wherein the pie-shaped compartment is configured for use as a storage area, for housing a vending machine, a closet, for housing aircraft electronics or other equipment, for storing safety equipment, or any combination thereof.

15. The galley layout of claim 11, wherein the first and second galley sections are both rotated to one side of the center plane.

16. The galley layout of claim 1, wherein the longitudinal axes of the at least two galley sections are parallel to one another.

17. The galley layout of claim 1, further comprising a privacy curtain or closeable door for the compartment comprising two crew rest levels.

* * * * *